(12) United States Patent
Fassbender et al.

(10) Patent No.: US 7,268,666 B2
(45) Date of Patent: Sep. 11, 2007

(54) DELIVERY RECEPTACLE FOR GOODS COMPRISING A CODE LOCK

(75) Inventors: Jörg Fassbender, Dortmund (DE); Gerald Weber, Auf Dem Placken 15, 59071 Hamm (DE)

(73) Assignee: Gerald Weber, Hamm (DE)

( * ) Notice: Subject to any disclaimer, the term of this patent is extended or adjusted under 35 U.S.C. 154(b) by 15 days.

(21) Appl. No.: 10/181,131

(22) PCT Filed: Jan. 11, 2001

(86) PCT No.: PCT/EP01/00326

§ 371 (c)(1),
(2), (4) Date: Nov. 12, 2002

(87) PCT Pub. No.: WO01/51744

PCT Pub. Date: Jul. 19, 2001

(65) Prior Publication Data

US 2003/0154891 A1    Aug. 21, 2003

(30) Foreign Application Priority Data

| Jan. 14, 2000 | (DE) | ............................ 100 01 538 |
| Feb. 10, 2000 | (DE) | ............................ 100 06 053 |
| Apr. 20, 2000 | (DE) | ............................ 100 19 966 |
| Jul. 11, 2000 | (DE) | ............................ 100 33 664 |
| Oct. 5, 2000 | (DE) | ............................ 100 49 612 |

(51) Int. Cl.
*B60R 25/00*    (2006.01)
(52) U.S. Cl. ................ 340/5.73; 340/5.9; 340/5.21; 340/5.28; 340/569; 340/542; 340/5.2; 340/5.27; 340/10.1
(58) Field of Classification Search ............... 340/5.73, 340/5.7, 5.71, 5.9, 5.21, 5.28, 569, 542, 5.2, 340/5.27, 10.1; 70/276–277, 278.2, 278.3, 70/278.7, 283; 109/54, 55
See application file for complete search history.

(56) References Cited

U.S. PATENT DOCUMENTS 4,296,872 A * 10/1981 Mitchell et al. ............ 221/195

(Continued)

FOREIGN PATENT DOCUMENTS

DE    297 12 361    1/1998

(Continued)

*Primary Examiner*—Brian Zimmerman
*Assistant Examiner*—Vernal Brown
(74) *Attorney, Agent, or Firm*—Collard & Roe, P.C.

(57) ABSTRACT

The invention relates to an article delivery receptacle (10) comprising an electronic code lock (11). When delivering articles (8), the delivery person opens the receptacle (10) by entering a delivery code (6) into the electronic code lock (11). During the ordering process, the addressee (1) conveys the required delivery code (6) to the delivery person (9) via the supplier (9) of the ordered articles (8). After the articles (8) are deposited in the receptacle, the receptacle (10) is locked once again so that the articles (8) placed therein are protected from theft. After a successful delivery, the code lock (11) is blocked so that it is no longer possible to open the delivery receptacle (10) using the delivery code (6). The addressee can remove the delivered articles (8) from the receptacle (10) by using an addressee key (12) which only the addressee possesses. After removing the articles (8), the delivery receptacle is enabled once again for receiving subsequent deliveries of articles.

13 Claims, 2 Drawing Sheets

U.S. PATENT DOCUMENTS

Figure 1:
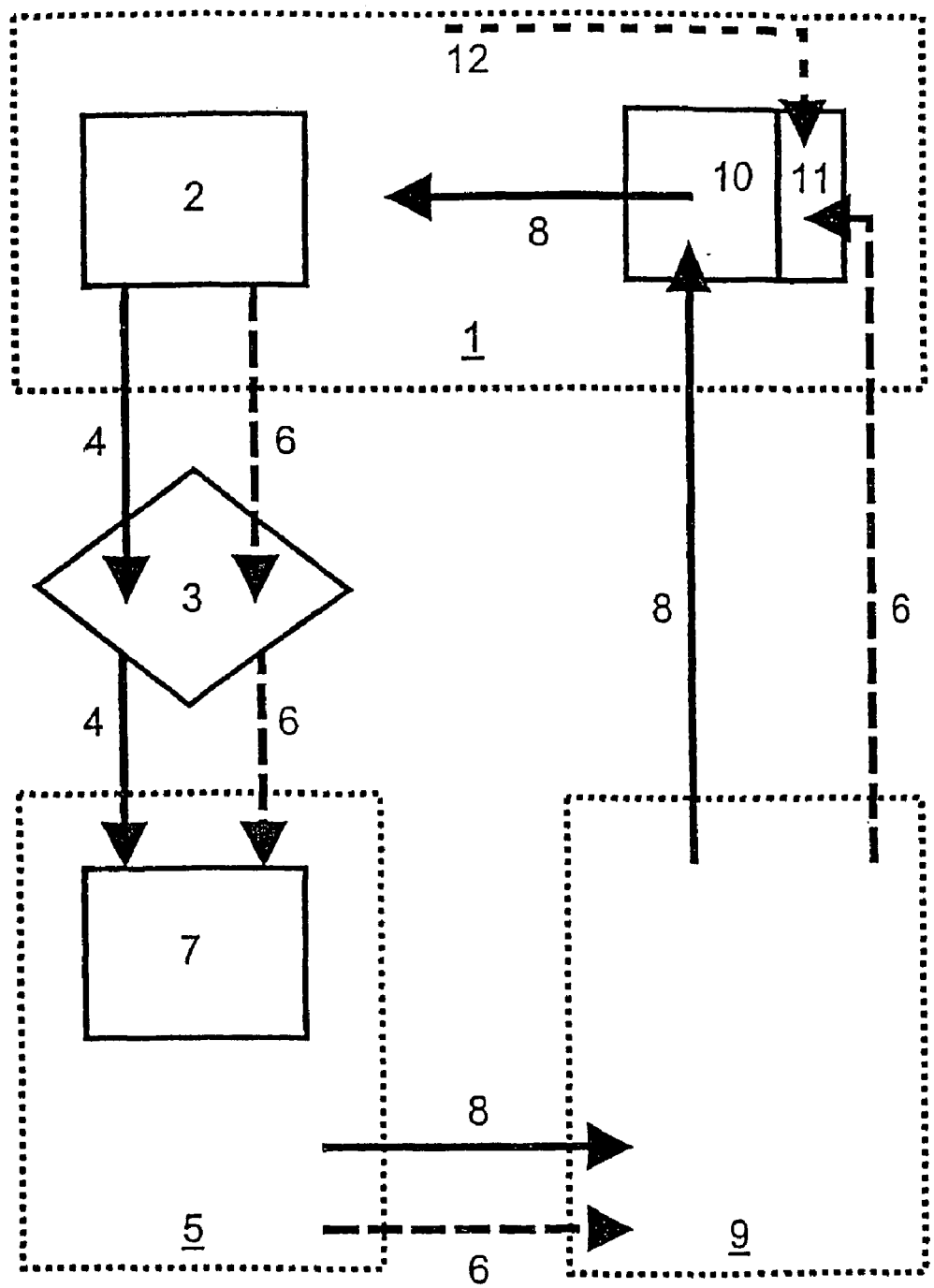

| | | | | | |
|---|---|---|---|---|---|
| 4,923,114 | A | * | 5/1990 | Fiske, Jr. | 232/34 |
| 5,223,829 | A | * | 6/1993 | Watabe | 340/5.73 |
| 5,774,053 | A | * | 6/1998 | Porter | 340/568.1 |
| 5,979,750 | A | | 11/1999 | Kindell | |
| 6,323,782 | B1 | * | 11/2001 | Stephens et al. | 340/10.31 |
| 6,570,488 | B2 | * | 5/2003 | Kucharczyk et al. | 340/5.2 |
| 6,715,669 | B2 | * | 4/2004 | Hara | 232/45 |

FOREIGN PATENT DOCUMENTS

| | | |
|---|---|---|
| DE | 298 07 184 | 8/1998 |
| EP | 0 821 518 | 1/1998 |
| WO | 00 76378 | 12/2000 |
| WO | 01 15579 | 3/2001 |

* cited by examiner

DELIVERY RECEPTACLE FOR GOODS COMPRISING A CODE LOCK

CROSS REFERENCE TO RELATED APPLICATIONS

Applicants claim priorities under 35 U.S.C. §119 of German Applications Nos. 100 01 538.7, filed Jan. 14, 2000; 100 06 053.6, filed Feb. 10, 2000; 100 19 966.6, filed Apr. 20, 2000; 100 33 664.7, filed Jul. 11, 2000; and 100 49 612.1, filed Oct. 5, 2000. Applicants also claim the priority under 35 U.S.C. §365 of PCT/EP01/00326, filed Jan. 11, 2001. The international application under PCT article 21(2) was not published in English.

The invention relates to a method for the operation of an article delivery receptacle with an electronic code lock, whereby access to the receptacle for the delivery of articles occurs by means of a delivery code through which the deliverer is authorized for access. Furthermore, the invention relates to the delivery receptacle for goods for implementing this method.

All types of mail order businesses are included in the term "E-Commerce," by which the offering of goods occurs through a global data network (Internet) and by which the ordering is also carried out by the buyer online through the data network. An important problem with the acceptance of the mail-order business of E-commerce is based on the current practice of home delivery of ordered articles. Often the addressee is not present at his residence at the time of delivery. In this case either the delivery must be repeated or the addressee must personally pick up the article at a central distribution point of the delivery company. Alternatively, when the addressee is absent, the article is delivered to neighbors or simply left at the front door. The latter is ruled out for valuable goods, for which a receipt from the addressee is required.

The described practice of home delivery of articles is considered by customers to be inconvenient and unsafe. A considerable risk of theft exists, especially when the articles in the absence of the addressee are placed in the vestibule of the apartment house, on the landing of the stairs or outside the front door. Delivery methods are desired by online-suppliers as well as delivery companies that can occur at any time of day independent of whether the addressee is present in person. For this, it is necessary that the deliverer can safely deposit the article at the residence of the addressee in a way protected from theft.

DE 297 12 361 proposes a delivery receptacle suitable for this. It relates to a large-volume box that can be locked. It is used like a conventional mailbox for the delivery of articles at the residence of the addressee. The known box has an electronic code lock so that a deliverer, who is authorized by means of a corresponding number code, can open the box to deposit the order article. After that, the article is protected in the delivery receptacle against theft until it is removed by the addressee. Furthermore, it is provided for in the known delivery box, that the delivered article is furnished with an electronic chip through which the article is identified by means of an electronic reception unit integrated into the delivery box. The delivery and removal of certain articles are automatically registered in this way. This makes it possible to issue a receipt for the article electronically identified by the box.

The disadvantage of the known delivery box is that a relatively large circle of deliverers that is difficult to manage must be authorized for access. A significant security drawback is that it is possible for third parties, who gain unauthorized possession to the number code for access to delivery box, to steal the articles deposited in the box after the delivery has occurred. A further disadvantage is that the method for issuing a receipt requires costly electronics. Part of that are the electronic chips, which have to be mounted on the individual articles, as well as the associated electronics for reception, which for the known delivery box consists, among other things, of a frame antenna mounted inside the box. This expensive electronics results in significant costs, which neither the mail-order business nor the potential customers are willing to pay.

A similar delivery system is known from U.S. Pat. No. 5,223,829. In this known system also there is needed an expansive sensory system which determines if the delivery container is occupied or not. Such a sensory system, of course, is prone to mistakes and disturbances. A major disadvantage in the installation described in U.S. Pat. No. 5,223,829 consist therein that always one compartment of the installation is made available by inserting the house or apartment number of the receiver. This means that any person can open the installation even if there are no goods to be delivered. By that, it is relatively easy to mis-use the installation for any throw-in.

Correspondingly, the underlying task of the invention at hand is to make available a method for operating an article delivery receptacle as well as a delivery receptacle for goods while avoiding the disadvantages previously mentioned. This method should make possible the depositing of the ordered article at the residence of the addressee while protecting the article from theft, so that especially unauthorized people cannot receive access to the article deposited at the addressee's residence. The method should be implementable without special costs by any delivery company and without reorganizing the established delivery procedure. At the same time, the delivery receptacle used should be simply constructed and cost-efficient to produce.

For the process for operating an article delivery receptacle with an electronic code lock of the type mentioned at the beginning, this task is solved after the delivery by blocking the article delivery container for access by means of a delivery code, whereby the receptacle can always be opened with an addressee key, and whereby the code lock is always unlocked as soon as an attempt to the article delivery container by means of the addressee key takes place so that the article delivery container can be opened after that by means of a delivery code for the delivery of a shipment.

During delivery, the deliverer opens the electronic code lock of the article delivery receptacle by means of a delivery code, which authorizes the deliverer for access. This delivery code is a permanent part of the receiver's address and, therefore, does not have to be set up at great expense. After that, the deliverer deposits the article inside the article delivery receptacle and then locks the receptacle again. Thus the article within the receptacle is protected securely from theft. According to the invention, access by third parties in unauthorized possession of the delivery code is prevented by blocking the article delivery receptacle for renewed access after the delivery occurs by means of a delivery code. In contrast, the addressee of the article has a key that allows him at any time to open the article delivery receptacle assigned to him, for example in order to take out delivered goods. If the addressee uses his addressee key for withdrawing goods, the code lock is again automatically unlocked so that the article delivery receptacle is ready for the next delivery by means of the delivery code.

According to the invention, the method is based on the fundamental idea of making access to the delivery receptacle possible in two different independent ways. On the one hand, a delivery code is used with which the article delivery receptacle can be opened. With the delivery code, any person can be authorized for access to the article delivery receptacle, whereby only the deposit of articles in the delivery receptacle is possible with the delivery code. In contrast to the known delivery box, according to the invention, there is no special security risk with the method of authorizing any person for access to the delivery receptacle. According to the invention, an unauthorized removal of articles is ruled out since the code lock can not be opened a second time by means of the delivery code as soon as an article is in the receptacle. On the other hand, it is possible to open the delivery receptacle by means of the addressee key, which however only the addressee has. The deliver agent always opens an empty compartment, the receiver always a filled one. Thus, according to the invention, a removal of the articles in the delivery receptacle is only possible for the addressee.

In the method according to the invention, the code lock is also automatically lock is enabled as soon as access to the article delivery receptacle with the addressee key occurs, so that the receptacle can be opened after that for the delivery of articles by means of the delivery code. In this way, the article delivery receptacle is prepared after emptying by means of the addressee key for the next delivery, for which the opening of the receptacle must be possible with the delivery code. After the delivery receptacle has been accessed by the addressee key there is no longer any danger that the receptacle will be opened by unauthorized persons with the delivery code for the purpose of theft because there is no longer any article in the article delivery receptacle.

With the delivery boxes for goods operated according to the invention, delivery can already take place today without any adjustment of the E-commerce companies' existing and proven delivery procedures, while avoiding the security and convenience problems described above. Usually, E-commerce suppliers use an input mask on their internet homepage, in which the purchaser enters his name and address. This input mask, as a rule, also contains an input field that can be used freely by the purchaser for additions to the address. Such an input field can be used in a practical way to convey the delivery code for the delivery receptacle to the E-commerce company. During the delivery process for the ordered article, the code is printed on the package to be delivered as a permanent part of the address; and then, during the delivery process, the deliverer can directly read the code from the package in order to open the delivery receptacle assigned to the addressee. Usually, the purchaser registers as a customer with most E-commerce suppliers once. During that process, the data necessary for delivery is entered once, as described above. Thus the E-commerce companies are simultaneously given a permanent delivery code as a part of the address that can be used for all future orders. Thus has the advantage that the supplier is involved in the procedure of the invention without having to do anything or make any changes in his organization. Based on the way the delivery receptacle operates in accordance with the invention, there is no particular security risk in this information, which is transferred without any secrecy, because it is only possible to open the delivery receptacle with this code if there is no article in it. The transfer of the delivery is always possible. Even in a case in which a supplier does not intend to leave space for an additional address line. It is possible to replace the name by the delivery code. This can even be of advantage if the addressee prefers an anonymous delivery. By the clear connection between the delivery code and the addressee code, it is made certain that the right addressee can take out his goods.

The delivery code, which is transferred by the addressee to the supplier during the ordering process before shipping, is conveniently affixed to the ordered article. Usually during shipment of the article address stickers are generated that contain the delivery address supplied by the addressee. These address labels contain thereby automatically also the delivery code to be used for opening the article delivery receptacle.

It can be advantageous when the delivery code is affixed to the article in machine-readable form. In this way the delivery process, in accordance with the invention, is made easier still. It is, for example, conceivable that the addressee's article delivery receptacle has a device with which the machine-readable code for opening the article delivery receptacle, which is affixed on the article, can be read. The use of a machine-readable delivery code has the additional advantage that the required code for access to the delivery receptacle cannot easily fall into the hands of unauthorized people.

Conveniently, the article delivery receptacle can have a mechanism through which the deliverer receives a receipt after the delivery takes place.

For implementation of the method according to the invention, a article delivery receptacle with an electronic code lock is suitable, which can be opened by means of a delivery code and an addressee key. The code lock is assigned to a program control with which the code lock is blocked after the opening of the article delivery receptacle by means of a delivery code, so that access after that is no longer possible with the delivery code. The code lock is enabled once again if the article delivery receptacle is opened with the addressee key. It is possible to furnish in a simple way the theft-proof receptacles that can be locked with program-controlled electronic code locks. Even a retrofitting of customary mailboxes that can be locked with such a code lock is conceivable. Compared with the known delivery box, the advantage of the method according to the invention is that it can be implemented with simple means and with little expense. For implementation or the method according to the invention, a delivery receptacle with an electronic code lock is suitable, which can be opened by means of a delivery code and an addressee key. The code lock has a program control with which the code lock is blocked after the opening of the receptacle by means of a delivery code, so that access after that is no longer possible with the delivery code. The code lock is enabled once again if the receptacle is opened with the addressee key. It is possible to furnish in a Simple way the theft-proof receptacles that can be locked with program-controlled electronic code locks. Even a retrofitting of customary mailboxes that can be locked with such a code lock is conceivable. Compared with the known delivery box, the advantage of the method according to the invention is that it can be implemented with simple means and with little expense. In addition, the article delivery receptacle can be divided into a multitude of chambers lockable independent from each other. This especially offers advantages when several deliveries take place, i.e. by different package services, during the absence of the addressee.

It is additionally purposeful that the article delivery receptacle is furnished according to the invention with an issuing unit with which the issuing of a voucher for receipt occurs after delivery has taken place. A confirmation of receipt of the article in the form of a written voucher is required, in particular with the shipment of more valuable articles. In accordance with the invention, proof of delivery can occur, for example, for the delivery receptacle if the issuing unit generates a voucher of receipt in which the addressee, to whom the delivery receptacle is assigned, is clearly identified. The delivery code used for the delivery receptacle's receipt should also be stated on the voucher for receipt. Time and date can also be on the voucher of receipt as further information, in order to document the delivery that occurred.

It is additionally of advantage to assign to the code lock an electronic storage unit in which plurality of delivery codes and addressee codes can be stored. In this way it is possible that several addressees may receive goods via one and the same article delivery receptacle.

It is useful to provide the control of the article delivery receptacle with a reading device by which delivery codes in machine readable form may be read for opening the article delivery receptacle. With this, the delivery process is, on the one hand, simplified. On the other hand, as already mentioned, the use of a machine readable delivery code leads to a further increase in the level of security.

The delivery receptacle offers advantages with a code lock that opens and locks the delivery receptacle, whereby the code lock only can be locked by entering a locking code. In this case the delivery receptacle is open until the delivery of the article. The deliverer deposits the shipment in the receptacle and locks it by entering the locking code. In this way the delivery process is considerably simplified and expedited. Since the code lock can only be locked by entering the locking code, there is no danger that the delivery receptacle could be locked inadvertently or maliciously, whereby the delivery of the article could unwantedly be prevented. Such a delivery receptacle has the further advantage that it can always be recognized whether the expected delivery of the article has already occurred or not. The lock code can be conveniently transferred to the deliverer according to the delivery process as stated in the invention.

Figure 2:
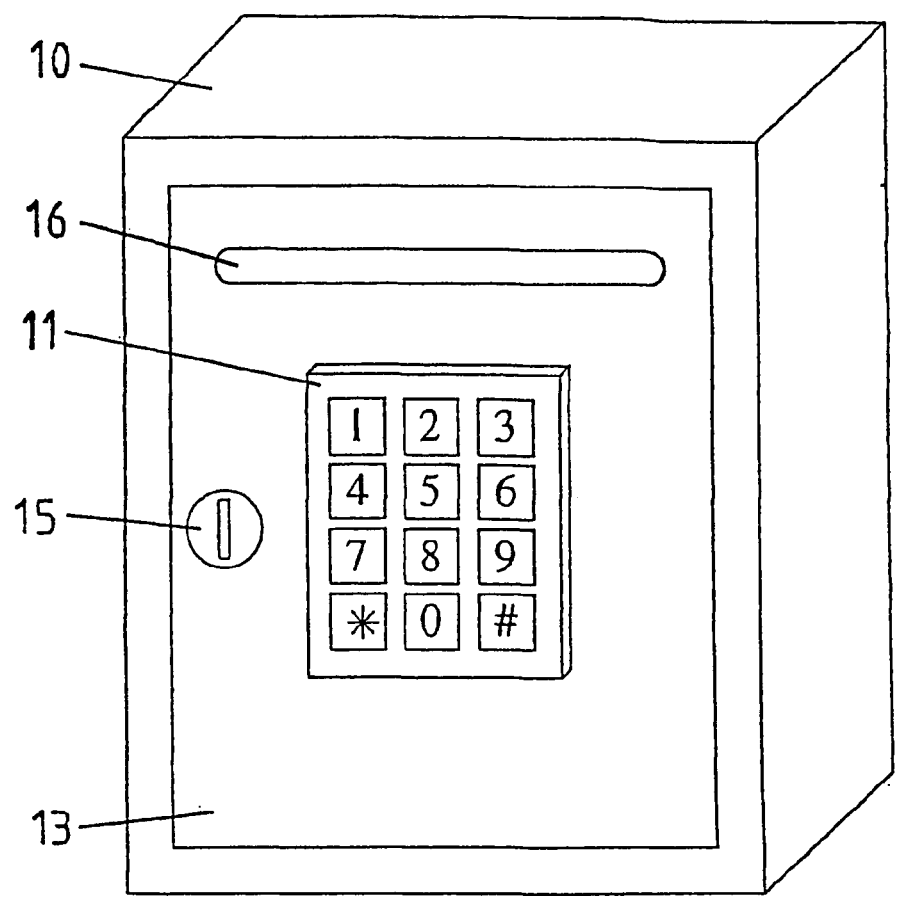
Figure 2:
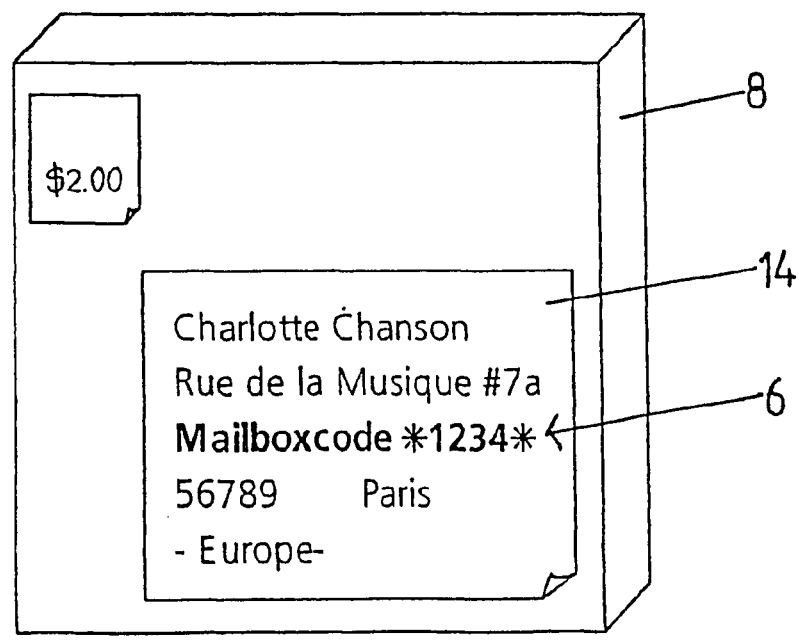

Exemplified embodiments of the invention are explained in the following on the basis of the figures. They show:

FIG. 1 Schematic illustration of an ordering and delivery process according to the invention;

FIG. 2 Delivery receptacle with code lock according to the invention;

FIG. 1 shows a addressee 1, who transmits an article order 4 to an online-supplier 5 by means of the receiver's PC 2 by way of a global data network 3, for example the internet. Together with the order 4, a delivery code 6 is simultaneously transmitted to a server 7 of the online-supplier 5. The online-supplier 5 turns over a package 8 that contains the ordered article as well as the delivery code 6 to the delivery company 9. It delivers the article 8 to the addressee 1 in that the deliverer 9 deposits the package 8 in a article delivery container receptacle 10. The deliverer 9 receives access to the article delivery receptacle 10 by means of a delivery code 6, in which he enters the delivery code 6 into the program control of an electronic code lock 11 of the article delivery receptacle 10. After entering delivery code 6, the code lock 11 is blocked according to the invention, so that the package 8 cannot be removed from the article delivery receptacle 10 by means of the code 6 without authorization. After delivery occurs the addressee 1 removes the article 8 from the article delivery receptacle 10 by opening this by means of an addressee key 12 that is only available to him.

FIG. 2 shows the article delivery receptacle 10 with the electronic code lock 11. The article delivery receptacle 10 has a front flap 13 that is secured by the code lock 11. The figure shows furthermore the package 8, on which an address sticker 14 has been affixed by the online-supplier 5. In addition to the address of the addressee, the address sticker 14 contains the delivery code 6, by which the deliverer is authorized for access to the delivery receptacle 10. For example, as was already described, the delivery code 6 can be transmitted during the first ordering process by the addressee to the online-supplier. Today an additional address field can be used for this, in which the addressee enters the delivery code 6 by way of a corresponding input mask on the internet pages of the supplier. If such an additional address field is not present, the delivery code 6 can otherwise be added to the address or it can replace the name. The deliverer enters the delivery code 6 into the electronic code lock 11, whereupon the front flap 13 allow itself to be opened. The delivery process is finished when the flap 13 is again closed after the package 8 has been placed inside the article delivery receptacle 10. In accordance with the programming of the code lock 11, a blocking then occurs so that it is no longer possible to again open the article delivery receptacle 10 by means of the delivery code 6. According to the invention, only the addressee can open the delivery receptacle 10 for removal of the delivered package 8 by means of his addressee key for a mechanical lock 15. After that the code lock 11 is activated for a subsequent article delivery. The flap 13 of the article delivery receptacle 10 additionally has a letter slot 16, through which normal correspondence can be dropped in independent of the delivery process according to the invention.

The invention claimed is:

1. A process for operating an article delivery receptacle comprising an electronic code lock, wherein opening of the article delivery receptacle for delivery of articles to a recipient occurs by means of a permanent delivery code authorizing access to a deliverer, the deliverer entering the permanent delivery code into the code lock in order to open the article delivery receptacle, and by means of a recipient key controlled by the recipient, the recipient key comprising a key code for the code lock or a mechanical key for opening the article delivery receptacle, said process comprising the steps of:
    (a) blocking access to the article delivery receptacle after opening of the article delivery receptacle by means of the permanent delivery code has occurred so that after access is blocked, the article delivery receptacle can be opened only by means of the recipient key; and
    (b) allowing access to the article delivery receptacle by means of the permanent delivery code again as soon as opening of the article delivery receptacle by means of the recipient key has occurred so that the article delivery receptacle can be opened afterwards by means of the permanent delivery code for the delivery of articles.

2. An article delivery receptacle comprising an electronic code lock that permits opening of the article delivery receptacle for delivery of articles to a recipient by means of a permanent delivery code authorizing access to a deliverer and by means of a recipient key controlled by the recipient, the deliverer entering the permanent delivery code into the code lock in order to open the article delivery receptacle, the recipient key comprising a key code for the code lock or a mechanical key for opening the article delivery receptacle, said code lock comprising a program control that locks the code lock from renewed opening by means of the permanent delivery code after opening of the article delivery receptacle by means of the permanent delivery code has taken place so that after the code lock is locked, the article delivery receptacle can be opened only by means of the recipient key, said code lock being unlocked to allow access to the article delivery receptacle by means of the permanent delivery code as soon as opening of the article delivery receptacle by means of the recipient key has taken place so that the article delivery receptacle can be opened afterwards by means of the permanent delivery code again for the delivery of articles.

3. The article delivery receptacle according to claim 2, further comprising an issuing unit through which the issuance of a voucher of receipt occurs after delivery has taken place.

4. The article delivery receptacle according to claim 2, wherein an electronic storage unit is assigned to the code lock, in which a plurality of permanent delivery codes can be stored.

5. The article delivery receptacle according to claim 2, further comprising a status display for displaying whether the code lock is locked after delivery has taken place or whether the article delivery receptacle is ready for delivery of articles.

6. The article delivery receptacle according to claim 2, further comprising a viewing window for visual inspection of receptacle contents.

7. The article delivery receptacle according to claim 2, further comprising an attachment element for releasably attaching the article delivery receptacle to a door panel or a door frame of a door.

8. The article delivery receptacle according to claim 7, wherein the attachment element forms a positive-lock connection with the door panel.

9. The article delivery receptacle according to claim 8, wherein the attachment element comprises a U-shaped profile, the door panel engaging into said U-shaped profile.

10. The article delivery receptacle according to claim 7, wherein the attachment element forms a force-locking connection with the door panel and the door frame when the door is closed.

11. The article delivery receptacle according to claim 7, further comprising two holder elements that engage opposite lateral edges of the door panel and are braceable relative to each other, wherein the attachment element comprises a clamping fastener fixable to the door panel in a force-locking way by said holder elements.

12. The article delivery receptacle according to claim 2, further comprising thermal insulation and a cooling unit.

13. The article delivery receptacle according to claim 2, further comprising a plurality of chambers that can be locked independent of one another.

* * * * *